United States Patent
Harless

(10) Patent No.: US 10,267,447 B2
(45) Date of Patent: Apr. 23, 2019

(54) FLUID PIPE ASSEMBLY INCLUDING LENGTH COMPENSATOR AND RELATED METHODS

(71) Applicant: Harris Corporation, Melbourne, FL (US)

(72) Inventor: Richard I. Harless, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 439 days.

(21) Appl. No.: 14/824,233

(22) Filed: Aug. 12, 2015

(65) Prior Publication Data

US 2017/0045172 A1    Feb. 16, 2017

(51) Int. Cl.
*F16L 51/00*    (2006.01)
*E21B 43/10*    (2006.01)

(52) U.S. Cl.
CPC ............ *F16L 51/00* (2013.01); *E21B 43/103* (2013.01); *Y10T 29/49826* (2015.01)

(58) Field of Classification Search
CPC .... F16L 51/00; E21B 43/103; E21B 43/2401; Y10T 29/49826
USPC ....... 285/298, 301, 114, 115, 224, 235, 382; 166/207
See application file for complete search history.

(56) References Cited

U.S. PATENT DOCUMENTS

| | | | |
|---|---|---|---|
| 4,313,627 A * | 2/1982 | de Lange | F16L 51/00 285/114 |
| 5,047,201 A | 9/1991 | Schmidt et al. | |
| 6,409,175 B1 | 6/2002 | Evans | |
| 7,021,013 B1 | 4/2006 | Schilling et al. | |
| 7,918,006 B2 | 4/2011 | Brayman et al. | |
| 8,770,280 B2 | 7/2014 | Buytaert et al. | |
| 8,772,683 B2 | 7/2014 | Parsche | |
| 2002/0092649 A1* | 7/2002 | Bixenman | E21B 43/103 166/207 X |
| 2006/0027370 A1* | 2/2006 | Weinrich | E21B 43/103 |
| 2011/0042096 A1* | 2/2011 | Nutley | 166/207 X |
| 2014/0262223 A1* | 9/2014 | Wright | E21B 43/2401 |

OTHER PUBLICATIONS

US 6,407,175 B1, 06/2002, Evans et al. (withdrawn)

* cited by examiner

*Primary Examiner* — Greg Binda
*Assistant Examiner* — Zachary T Dragicevich
(74) *Attorney, Agent, or Firm* — Allen, Dyer, Doppelt + Gilchrist, P.A.

(57) ABSTRACT

A fluid pipeline assembly may include a plurality of pipe segments coupled together in end-to-end relation, and a length compensator coupled between an adjacent pair of the plurality of pipe segments to define a fluid passageway therewith. The length compensator may include a tubular body having a plurality of openings spaced apart around a periphery thereof to permit a longitudinal change of the tubular body, and a sealing sleeve extending around the tubular body and covering the plurality of openings.

27 Claims, 4 Drawing Sheets

FLUID PIPE ASSEMBLY INCLUDING LENGTH COMPENSATOR AND RELATED METHODS

TECHNICAL FIELD

The present invention relates to fluid pipe assemblies, such as for hydrocarbon resource applications, and related methods.

BACKGROUND

In certain applications where fluids are transported via pipes, the pipes can be subject to stresses from thermal expansion or contraction caused by external temperatures and/or internal fluid temperatures. More particularly, metal pipes will expand or contract as temperatures rise and fall, which may lead to bending of pipes, as well as damage to joints that may compromise the fluid flow.

Various approaches are used in applications where piping is subjected to thermal stress from external or internal sources. One example is set forth in U.S. Pat. No. 7,021,013 to Schilling et al., which discloses a compensator for compensating thermal expansions of ducts or pipelines for carrying flows of hot media, especially ducts that are lined with fire-proof material. The compensator permits inspection of the operability of the expansion gap between adjacent sections of the pipeline and its elastic temperature-resistant jointing material from the outside of the pipeline. The expansion gap in the flame-proof lining is arranged in a cross section plane of the pipeline that is adjacent to but below the cross section plane of the corrugated pipe compensator attached to the steel sheet jackets of adjacent sections of pipeline. The steel sheet jackets are spaced from one another in the area of the expansion gap and the elastic temperature-resistant jointing material is accessible from outside the pipeline upon removal of jacket parts forming a collar around the expansion gap.

Despite the existence of such approaches, further approaches to addressing thermal expansion or compression in pipe assemblies may be desirable.

SUMMARY

A fluid pipeline assembly may include a plurality of pipe segments coupled together in end-to-end relation, and a length compensator coupled between an adjacent pair of the plurality of pipe segments to define a fluid passageway therewith. The length compensator may include a tubular body having a plurality of openings spaced apart around a periphery thereof to permit a longitudinal change of the tubular body, and a sealing sleeve extending around the tubular body and covering the plurality of openings.

More particularly, the plurality of openings may include a plurality of slotted openings. Moreover, the plurality of slotted openings may extend orthogonally to a longitudinal axis of the tubular body. In addition, the tubular body may have at least one stop opening extending therethrough, and the length compensator may further include at least one mechanical stop carried by the outer sleeve and extending into the at least one stop opening to limit a longitudinal extension of the tubular body. In particular, the mechanical stop may have a length shorter than a length of a corresponding stop opening.

The length compensator may further include a plurality of seals between the sealing sleeve and the tubular body. Furthermore, at least one of the pipe segments may comprise a radio frequency (RF) dielectric isolator segment. Additionally, at least one of the pipe segments may have a plurality of fluid openings extending radially therethrough and in fluid communication with the fluid passageway. The tubular body may also have opposing threaded ends.

A related method for assembling a fluid pipeline may include coupling a plurality of pipe segments together in end-to-end relation, and coupling a length compensator between an adjacent pair of the plurality of pipe segments to define a fluid passageway therewith. The length compensator may include a tubular body having a plurality of openings spaced apart around a periphery thereof to permit a longitudinal change of the tubular body, and a sealing sleeve extending around the tubular body and covering the plurality of openings.

DETAILED DESCRIPTION OF THE EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
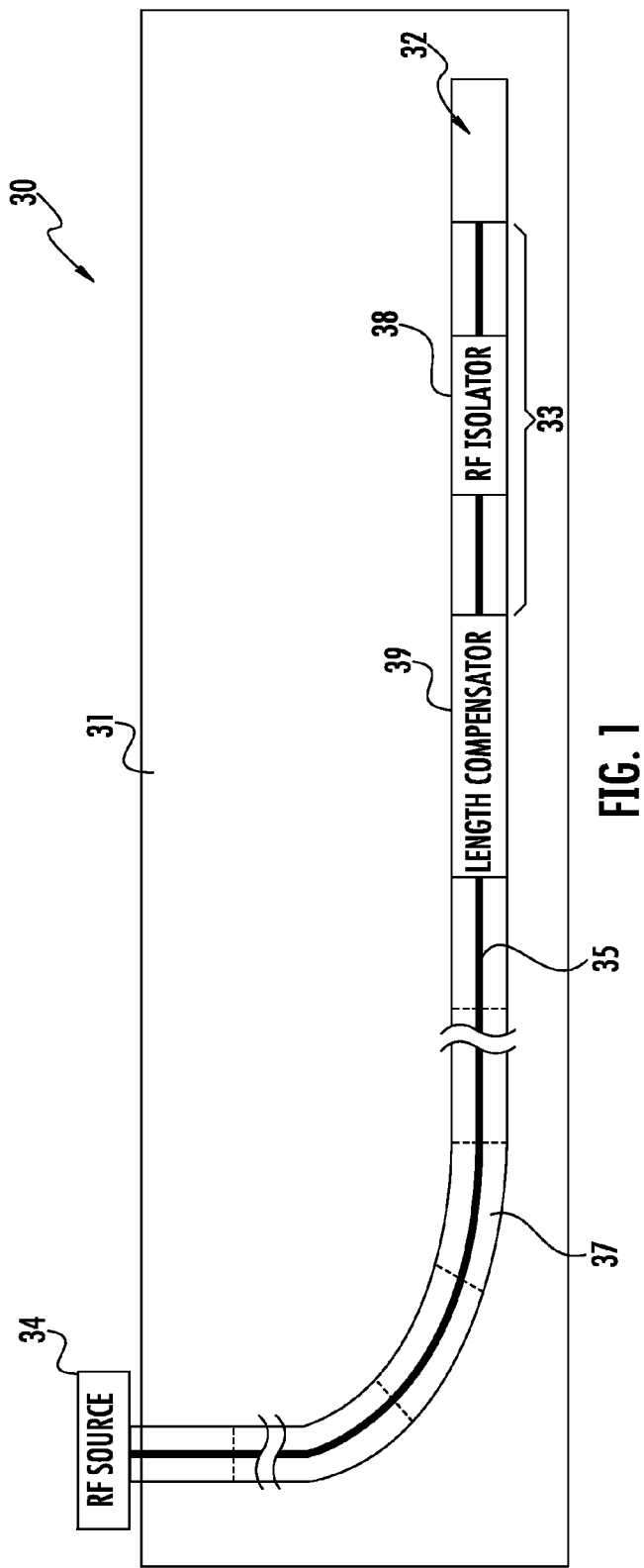
FIG. 1 is a schematic block diagram of a hydrocarbon resource recovery system including a piping assembly with a length compensator in accordance with an example embodiment.

Referring initially to FIG. 1, a hydrocarbon resource recovery system 30 may be used for heating a hydrocarbon resource within a geological formation 31. By way of example, the system 30 may be used for the recovery of hydrocarbons from oil sand or other deposits. Hydrocarbon materials that are too thick to flow for extraction from geologic deposits are often referred to as heavy oil, extra heavy oil and bitumen. These materials include oil sands deposits, shale deposits and carbonate deposits. Many of these deposits are typically found as naturally occurring mixtures of sand or clay and dense and viscous petroleum.

In the illustrated example, a wellbore 32 extends within the subterranean formation 31, and the system 30 includes a radio frequency (RF) antenna 33 configured to be positioned within the wellbore, an RF source 34 at the wellhead, and a transmission line 35 coupled between the RF antenna and the RF source. More particularly, the transmission line 35 extends within a liner 37 which is made up of a plurality of tubular pipe segments (indicated by dashed lines in FIG. 1) which are coupled together in end-to-end relation and fed into the borehole 32. By way of example, the tubular pipe segments may have opposing threaded ends and may be screwed together as they are inserted in the wellbore 32.

Heating of the subterranean formation 31 advantageously helps in the hydrocarbon extraction process, which may be accomplished through a separate producer well(s) and/or by extraction through the liner 37 in some embodiments. Further details on RF heating of subterranean formations for hydrocarbon resource recovery are set forth in U.S. Pat. No. 8,772,683 to Parsche, which is assigned to the present Applicant Harris Corp., and which is hereby incorporated herein in its entirety by reference.

With respect to systems that utilize RF energy to provide heating, such systems may suffer from a high degree of electrical near field coupling that exists between the radiating antenna element 33 and the transmission line 35 that delivers the RF power to the antenna, resulting in common mode current on the liner 37, for example. Left unchecked, this common mode current heats unwanted areas of the formation, effectively making the liner 37 part of the radiating antenna. As a result, an RF isolator 38, which is made of a dielectric material, is sometimes coupled in line with the segments of the liner 37 to help prevent these common mode currents from traveling back up the liner from the antenna 33.

However, well pipe, even once installed in a reservoir, is subject to expansion and contraction due to heating, cooling or other environmental factors. In the reservoir, expansion/contraction within the borehole 32 may be constricted by the surrounding geological formation. If constrained, the pipe segments of the liner 37 may generate significant internal tensile loads while contracting, or significant internal compressive loads if expanding.

This problem may become particularly acute in the longitudinal dimension where pipe lengths may extend hundreds of meters. More particularly, expansion and contraction over such distances may potentially exceed several meters and/or result in very large (e.g., $10^6$ lbf) internal loads. Internal pipe loads resulting from these conditions may cause field failures such as buckling/twisting of the pipe string, as well as dimensional changes in the case of a slotted pipe, leading to loss of sand control or other structural failures that may result in the loss of the well. Moreover, this problem is especially acute for composite RF isolators 38, as dielectric isolator materials typically do not have the required strength to withstand such forces. Since the composite isolator(s) 38 is in series with the relatively stiff, high strength metal segments of the liner 37, the isolators may accordingly get crushed beyond their capability to sustain integrity.

In the illustrated system, one or more length compensators 39 may be incorporated within the liner 37. Referring additionally to FIGS. 2-6, each length compensator 39 illustratively includes a tubular body 40 having a plurality of openings 41 spaced apart around a periphery thereof to permit a longitudinal change of the tubular body (see FIG. 3), and a sealing sleeve 42 extending around the tubular body and covering the plurality of openings. More particularly, the tubular body 40 of the length compensator 39 is machined with slots 41 oriented circumferentially around the perimeter of the tubular body which in the illustrated example extend orthogonally to a longitudinal axis X of the tubular body 40 (see FIG. 6). However, it should be noted that slots oriented in other directions (e.g., near orthogonal) may also be used in different embodiments. In addition, slot shapes other than straight slots of uniform width may also be used in certain embodiments. For example, a curved slot may have advantages over a straight slot in some implementations. Moreover, different types of slots (e.g., with different shapes, orientations, and/or dimensions) may be used together or intermixed in the same tubular body in some implementations, if desired. One or more sleeve welds 53 may be used to connect the end(s) of the sleeve 42 to the tubular body 40 as shown.

Figure 2:
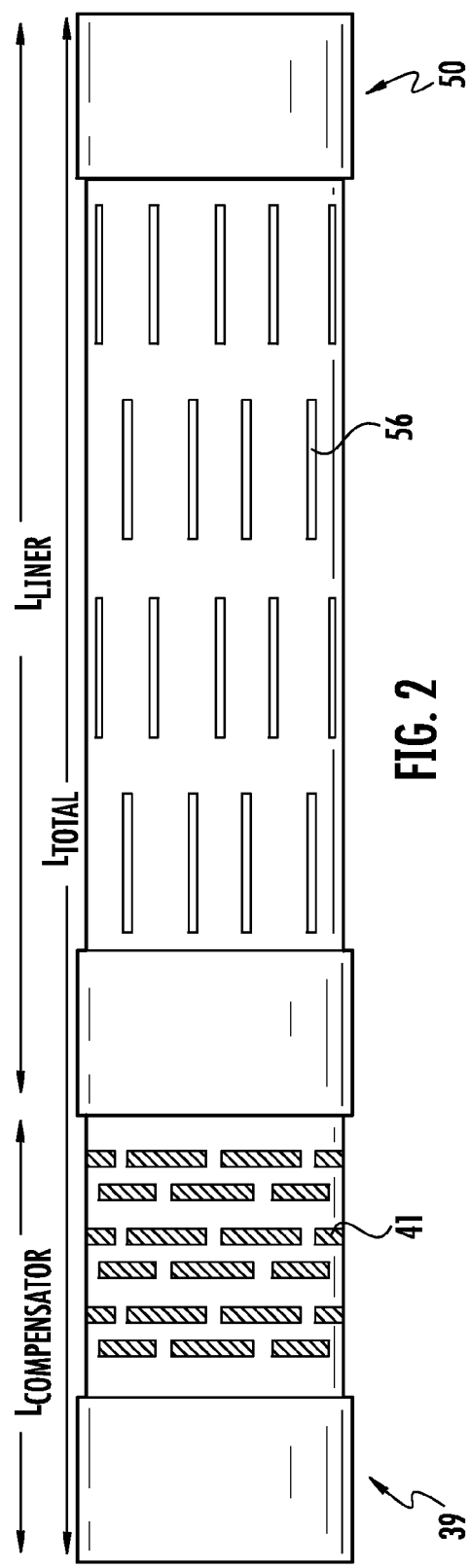
FIG. 2 is a side view of an example length compensator which may be used with the piping assembly of FIG. 1.

In the example of FIG. 2, the length compensator segment 39 is coupled to a slotted liner segment 50. Horizontal wells typically employ slotted liner sections 50 with slots 56 to allow a liquid (e.g., oil) to flow into a fluid passageway within the liner 37, or a gaseous (or liquid) flow of steam or solvent out of the liner, which may be used in steam assisted gravity drainage (SAGD) implementations, for example. The length compensator 39 may be used to attach one end of the slotted liner section 50 to its neighbor liner section to essentially provide a "spring" between them.

Figure 3:
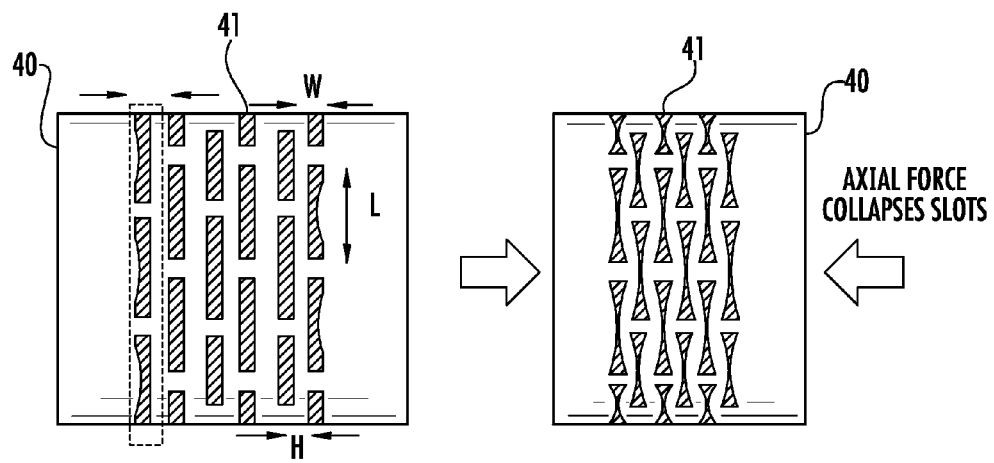
FIG. 3 is a side view illustrating a portion of the length compensator of FIG. 2 in greater detail before and after compression resulting from thermal expansion of the pipe segments.
Figure 4:
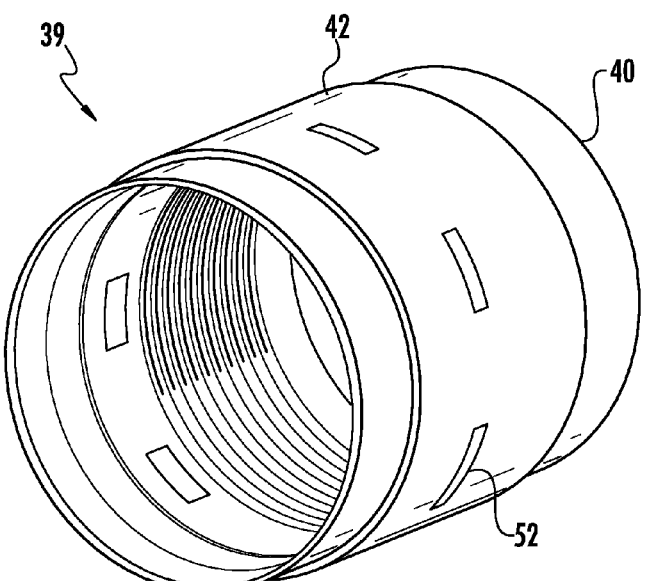
FIG. 4 is a perspective view of an example embodiment of the length compensator of FIG. 1.
Figure 5:
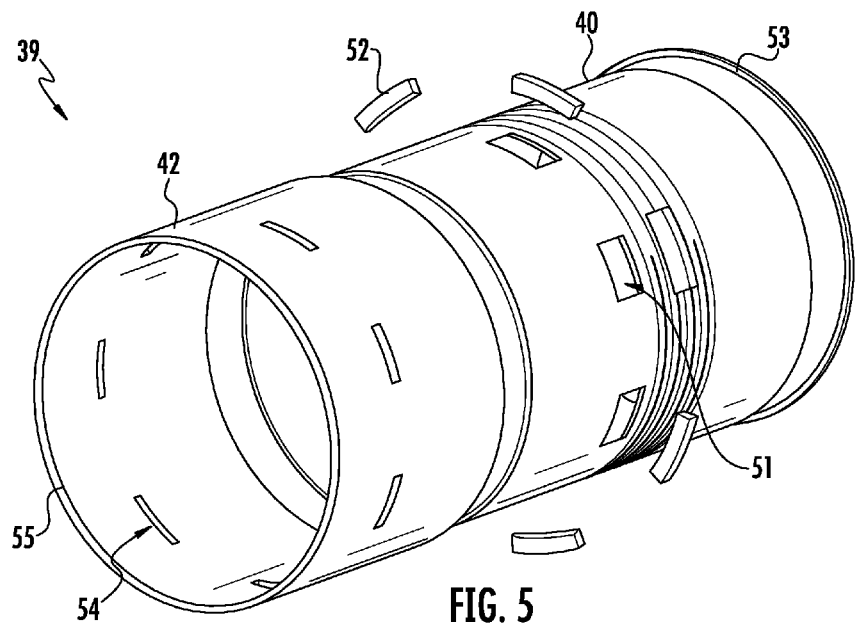
FIG. 5 is an exploded view of the length compensator of FIG. 4.

More particularly, the nature of the dimensions of the slots 41 may be calculated to satisfy mutually dependent limits on material stress and stiffness. To a first order, the length, width and thickness of the slots 41 may be derived such that the stress in the material, once the length compensator 39 is compressed as shown on the right hand side of FIG. 3, is within pipe material limits. The value L defines the length of each slot 41, the value W is the width of the slot, and the value H represents the height of material between slots.

The stress in the compressed length compensator 39 is related to the stiffness of a beam of length L and height H deflected by an amount W/2. The width of the cut through the pipe which defines the slot 41 is defined by the total amount of displacement required of the length compensator 39 (which essentially functions as a compressed spring in this example) and the number of columns of cuts included in the spring. Each column of width W+height H contributes an amount W to the total deflection of the spring. For example, if a total deflection of 1 inch is required and the allowable width of the slot 41 is 0.1 inches, then the number of columns of slots is 1÷0.1+1, or 11. The extra slot (+1) is provided since each slot column at the beginning and end of the spring only deflects W/2.

When installing well piping, there may be a significant tensile load on the assembled pipe as it is suspended in the vertical portion of the wellbore 32 during the insertion process, as the weight of the pipe continues to increase as more segments are added. In this regard, the tubular body 40 may optionally include one or more stop opening 51 extending therethrough, and the length compensator 39 may further include a respective mechanical stop 52 carried by the outer sleeve 42 and extending into the stop opening to limit a longitudinal extension of the tubular body. In particular, the mechanical stop 52 may have a length shorter than a length of a corresponding stop opening 51. That is, the stop openings 51 and stops 52 are configured so that the slots 41 are able to compress in response to a compressive force when installed in the lateral or horizontal portion of the borehole 32, but the stops prevent the slots from expanding or being pulled open as a result of a tensile force when the piping is suspended in the vertical portion of the borehole. As perhaps best seen in FIG. 5, the sleeve 42 may have openings 54 therein which during assembly overlap the stop openings 51 in the tubular body 40. The stops 52 may then be inserted through the openings 54 so that they extend into the stop openings 52, and the stops may then be welded to the sleeve 42 to hold them in place, for example. However, other arrangements of stops 52 may be used in different embodiments.

While the stops 52 and stop openings 51 are configured to limit expansion of the slots 41 in the illustrated embodiment, it should be noted that in other implementations the stops 52 may be configured to instead limit compression of the slots 41 and allow them to be expanded with tensile forces, if desired. In accordance with another configuration, the stops 52 may be used to allow both compression and expansion of the slots, but with outer limits on the amount of compression or expansion.

Figure 6:
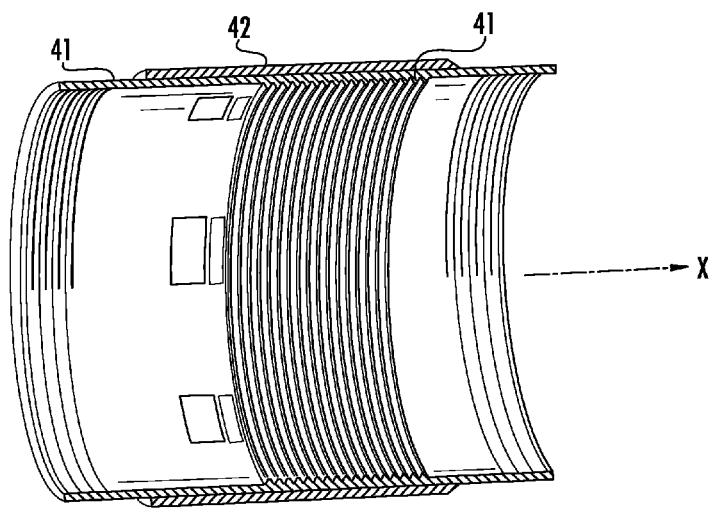
FIG. 6 is a cutaway view of the length compensator of FIG. 4.

In some embodiments, a respective seal 55 may be provided between the sealing sleeve 42 and the tubular body 40, if desired. In the illustrated example, the seal 55 is an O-ring seal. As seen in FIG. 6, the tubular body 40 has opposing threaded ends to be interconnected with adjacent pipe or liner segments.

The length compensator 39 advantageously provides "springs" at desired intervals along the length of the liner 37, and in particular may conveniently be located at desired liner section or segment joints. The length compensators 39 are sized to allow each segment of the liner 37 to expand (or contract) without generating significant force which may other damage components such as the RF isolator 38 or compromise segment joints. This results in RF isolator 38 (and liner 37) loads that are significantly reduced and within the capability of typical dielectric isolator materials. Furthermore, significantly reduced liner 37 loads may advantageously reduce or eliminate buckle potential or over stress conditions. It should be noted that while the length compensator 39 has been demonstrated herein with respect to a hydrocarbon RF heating pipeline, the length compensators described herein are applicable to other types of well pipelines, as well as above-ground piping configurations which are subject to compression or expansion from either internal or external thermal conditions, or other compressive or tensile loads.

The length compensator 39 provides a unique spring design which may be machined from standard pipe. Moreover, since it has no moving parts, and it may therefore be compatible with typical sand control requirements without the need for critical seals. The number and configuration of the length compensators 39 may be varied for use with a relatively wide range of expansion (length change). Again, the length compensator 39 may not only be used to replace a standard coupler (pipe joint) in a pipeline, it may also be compatible with RF current transmission line requirements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fluid pipeline assembly comprising:
   a plurality of pipe segments coupled together in end-to-end relation, at least one of said pipe segments comprising a radio frequency (RF) dielectric isolator segment; and
   a length compensator coupled between an adjacent pair of said plurality of pipe segments to define a fluid passageway therewith;
   said length compensator comprising
      a tubular body having a plurality of openings spaced apart around a periphery thereof to permit a longitudinal change of said tubular body, and
      a sealing sleeve extending around said tubular body and sealing the plurality of openings.

2. The fluid pipeline assembly of claim 1 wherein the plurality of openings comprises a plurality of slotted openings.

3. The fluid pipeline assembly of claim 2 wherein the plurality of slotted openings extend orthogonally to a longitudinal axis of said tubular body.

4. The fluid pipeline assembly of claim 1 wherein said tubular body has at least one stop opening extending therethrough; and further comprising at least one mechanical stop carried by said sealing sleeve and extending into the at least one stop opening to limit a longitudinal extension of said tubular body.

5. The fluid pipeline assembly of claim 4 wherein said mechanical stop has a length shorter than a length of a corresponding stop opening.

6. The fluid pipeline assembly of claim 1 further comprising at least one seal between said sealing sleeve and said tubular body.

7. The fluid pipeline assembly of claim 1 wherein at least one of said pipe segments has a plurality of fluid openings extending radially therethrough and in fluid communication with the fluid passageway.

8. The fluid pipeline assembly of claim 1 wherein said tubular body has opposing threaded ends.

9. A fluid pipeline assembly comprising:
   a plurality of pipe segments coupled together in end-to-end relation, at least one of said pipe segments comprising a radio frequency (RF) dielectric isolator segment; and
   a plurality of length compensators, each length compensator coupled between an adjacent pair of said plurality of pipe segments to define a fluid passageway therewith, each length compensator comprising
      a tubular body having a plurality of openings spaced apart around a periphery thereof to permit a longitudinal change of said tubular body, and
      a sealing sleeve extending around said tubular body and covering the plurality of openings.

10. The fluid pipeline assembly of claim 9 wherein the plurality of openings comprises a plurality of slotted openings.

11. The fluid pipeline assembly of claim 10 wherein the plurality of slotted openings extend orthogonally to a longitudinal axis of said tubular body.

12. The fluid pipeline assembly of claim 9 wherein said tubular body has at least one stop opening extending therethrough; and further comprising at least one mechanical stop carried by said sealing sleeve and extending into the at least one stop opening to limit a longitudinal extension of said tubular body.

13. The fluid pipeline assembly of claim 12 wherein said mechanical stop has a length shorter than a length of a corresponding stop opening.

14. The fluid pipeline assembly of claim 9 further comprising at least one seal between said sealing sleeve and said tubular body.

15. The fluid pipeline assembly of claim 9 wherein at least one of said pipe segments has a plurality of fluid openings extending radially therethrough and in fluid communication with the fluid passageway.

16. The fluid pipeline assembly of claim 9 wherein said tubular body has opposing threaded ends.

17. A method for assembling a fluid pipeline comprising:
coupling a plurality of pipe segments together in end-to-end relation, at least one of the pipe segments comprising a radio frequency (RF) dielectric isolator segment; and
coupling a length compensator between an adjacent pair of the plurality of pipe segments to define a fluid passageway therewith;
the length compensator comprising
a tubular body having a plurality of openings spaced apart around a periphery thereof to permit a longitudinal change of the tubular body, and
a sealing sleeve extending around the tubular body and sealing the plurality of openings.

18. The method of claim 17 wherein the plurality of openings comprises a plurality of slotted openings.

19. The method of claim 18 wherein the plurality of slotted openings extend orthogonally to a longitudinal axis of the tubular body.

20. The method of claim 17 wherein the tubular body has at least one stop opening extending therethrough; and wherein the length compensator further comprises at least one mechanical stop carried by the sealing sleeve and extending into the at least one stop opening to limit a longitudinal extension of the tubular body.

21. The method of claim 20 wherein the mechanical stop has a length shorter than a length of a corresponding stop opening.

22. The method of claim 17 wherein the length compensator further comprises at least one seal between the sealing sleeve and the tubular body.

23. The method of claim 17 wherein at least one of the pipe segments has a plurality of fluid openings extending radially therethrough and in fluid communication with the fluid passageway.

24. A fluid pipeline assembly comprising:
a plurality of pipe segments coupled together in end-to-end relation; and
a length compensator coupled between an adjacent pair of said plurality of pipe segments to define a fluid passageway therewith;
said length compensator comprising
a tubular body having a plurality of openings spaced apart around a periphery thereof to permit a longitudinal change of said tubular body, said tubular body having at least one stop opening extending therethrough,
a sealing sleeve extending around said tubular body and sealing the plurality of openings, and
at least one mechanical stop carried by said sealing sleeve and extending into the at least one stop opening to limit a longitudinal extension of said tubular body.

25. The fluid pipeline assembly of claim 24 wherein said mechanical stop has a length shorter than a length of a corresponding stop opening.

26. A fluid pipeline assembly comprising:
a plurality of pipe segments coupled together in end-to-end relation, at least one of the pipe segments having a plurality of fluid openings extending radially therethrough and in fluid communication with the fluid passageway; and
a length compensator coupled between an adjacent pair of said plurality of pipe segments to define a fluid passageway therewith;
said length compensator comprising
a tubular body having a plurality of openings spaced apart around a periphery thereof to permit a longitudinal change of said tubular body, and
a sealing sleeve extending around said tubular body and sealing the plurality of openings.

27. The fluid pipeline assembly of claim 26 wherein the plurality of openings comprises a plurality of slotted openings.

* * * * *